US006378400B1

(12) United States Patent
Bogli

(10) Patent No.: US 6,378,400 B1
(45) Date of Patent: Apr. 30, 2002

(54) DETACHABLE HANDLE SOCKET RATCHET WRENCH SYSTEM

(76) Inventor: Robert Bogli, 150 N. Lincoln Ave., Washington, NJ (US) 07882

( * ) Notice: Subject to any disclaimer, the term of this patent is extended or adjusted under 35 U.S.C. 154(b) by 0 days.

(21) Appl. No.: 09/849,430

(22) Filed: May 4, 2001

Related U.S. Application Data

(66) Substitute for application No. 09/238,927 on Jan. 28, 1999.

(51) Int. Cl.[7] .................................................. B25J 13/46
(52) U.S. Cl. ........................ 81/60; 81/177.2; 81/177.85
(58) Field of Search ......................... 81/60–63.2, 177.1, 81/177.2, 177.85

(56) References Cited

U.S. PATENT DOCUMENTS

| | | | |
|---|---|---|---|
| 1,665,944 | A | 4/1928 | Albertimi et al. |
| 2,190,081 | A | 2/1940 | Pfauser |
| 2,263,508 | A | 11/1941 | Lee |
| 4,829,857 | A | 5/1989 | Jones |
| 5,033,337 | A | 7/1991 | Thomas, III |
| 5,109,737 | A | 5/1992 | Raber |
| 5,193,419 | A | 3/1993 | Lee |
| 5,203,240 | A | 4/1993 | Sorter |
| D336,225 | S | 6/1993 | Lin |
| 5,685,208 | A | 11/1997 | Tidwell |

*Primary Examiner*—James G. Smith

(57) ABSTRACT

A detachable handle socket ratchet wrench system for permitting a user to change handles to suit the needs of the user. The detachable handle socket ratchet wrench system includes a ratchet head with a tubular sleeve outwardly extending therefrom defining a receptacle. A plurality of elongate handles are provided each having an insertion portion adjacent a distal end of the respective handle. The insertion portion of each of the handles is insertable into the receptacle of the sleeve. Each of the handle has a length defined between the proximal and distal ends of the respective handle. The length of a first of the handles is greater than the length of a second of the handles and at least two times greater than the length of a third of the handles. The length of the third handle is greater than about one-half the length of the second handle and less than about four-fifths the length of the second handle.

9 Claims, 2 Drawing Sheets

DETACHABLE HANDLE SOCKET RATCHET WRENCH SYSTEM

REFERENCE TO RELATED APPLICATION

This application is a substitute for Application No. 09/238,927, filed Jan. 28, 1999.

BACKGROUND OF THE INVENTION

1. Field of the Invention

The present invention relates to ratchet wrenches and more particularly pertains to a new detachable handle socket ratchet wrench system for permitting a user to change handles to suit the needs of the user.

2. Description of the Prior Art

The use of ratchet wrenches is known in the prior art. More specifically, ratchet wrenches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,685,208 by Tidwell; U.S. Pat. No. 4,829,857 by Jones; U.S. Pat. No. 5,193,419 by Lee; U.S. Pat. No. 5,109,737 by Raber; U.S. Pat. No. 2,263,508 by Lee; and U.S. Pat. No. Des. 336,225 by Lin.

While these devices fulfill their respective, particular objectives and requirements, the aforementioned patents do not disclose a new detachable handle socket ratchet wrench system. The inventive device includes a ratchet head with a tubular sleeve outwardly extending therefrom defining a receptacle. A plurality of elongate handles are provided each having an insertion portion adjacent a distal end of the respective handle. The insertion portion of each of the handles is insertable into the receptacle of the sleeve. Each of the handle has a length defined between the proximal and distal ends of the respective handle. The length of a first of the handles is greater than the length of a second of the handles and at least two times greater than the length of a third of the handles. The length of the third handle is greater than about one-half the length of the second handle and less than about four-fifths the length of the second handle.

In these respects, the detachable handle socket ratchet wrench system according to the present invention substantially departs from the conventional concepts and designs of the prior art, and in so doing provides an apparatus primarily developed for the purpose of permitting a user to change handles to suit the needs of the user.

SUMMARY OF THE INVENTION

In view of the foregoing disadvantages inherent in the known types of ratchet wrenches now present in the prior art, the present invention provides a new detachable handle socket ratchet wrench system construction wherein the same can be utilized for permitting a user to change handles to suit the needs of the user.

The general purpose of the present invention, which will be described subsequently in greater detail, is to provide a new detachable handle socket ratchet wrench system apparatus and method which has many of the advantages of the ratchet wrenches mentioned heretofore and many novel features that result in a new detachable handle socket ratchet wrench system which is not anticipated, rendered obvious, suggested, or even implied by any of the prior art ratchet wrenches, either alone or in any combination thereof.

To attain this, the present invention generally comprises a ratchet head with a tubular sleeve outwardly extending therefrom defining a receptacle. A plurality of elongate handles are provided each having an insertion portion adjacent a distal end of the respective handle. The insertion portion of each of the handles is insertable into the receptacle of the sleeve. Each of the handle has a length defined between the proximal and distal ends of the respective handle. The length of a first of the handles is greater than the length of a second of the handles and at least two times greater than the length of a third of the handles. The length of the third handle is greater than about one-half the length of the second handle and less than about four-fifths the length of the second handle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new detachable handle socket ratchet wrench system apparatus and method which has many of the advantages of the ratchet wrenches mentioned heretofore and many novel features that result in a new detachable handle socket ratchet wrench system which is not anticipated, rendered obvious, suggested, or even implied by any of the prior art ratchet wrenches, either alone or in any combination thereof.

It is another object of the present invention to provide a new detachable handle socket ratchet. wrench system which may be easily and efficiently manufactured and marketed.

It is a further object of the present invention to provide a new detachable handle socket ratchet wrench system which is of a durable and reliable construction.

An even further object of the present invention is to provide a new detachable handle socket ratchet wrench system which is susceptible of a low cost of manufacture with regard to both materials and labor, and which accordingly is then susceptible of low prices of sale to the consuming public, thereby making such detachable handle socket ratchet wrench system economically available to the buying public.

Still yet another object of the present invention is to provide a new detachable handle socket ratchet wrench system which provides in the apparatuses and methods of the prior art some of the advantages thereof, while simultaneously overcoming some of the disadvantages normally associated therewith.

Still another object of the present invention is to provide a new detachable handle socket ratchet wrench system for permitting a user to change handles to suit the needs of the user.

Yet another object of the present invention is to provide a new detachable handle socket ratchet wrench system which includes a ratchet head with a tubular sleeve outwardly extending therefrom defining a receptacle. A plurality of elongate handles are provided each having an insertion portion adjacent a distal end of the respective handle. The insertion portion of each of the handles is insertable into the receptacle of the sleeve. Each of the handle has a length defined between the proximal and distal ends of the respective handle. The length of a first of the handles is greater than the length of a second of the handles and at least two times greater than the length of a third of the handles. The length of the third handle is greater than about one-half the length of the second handle and less than about four-fifths the length of the second handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
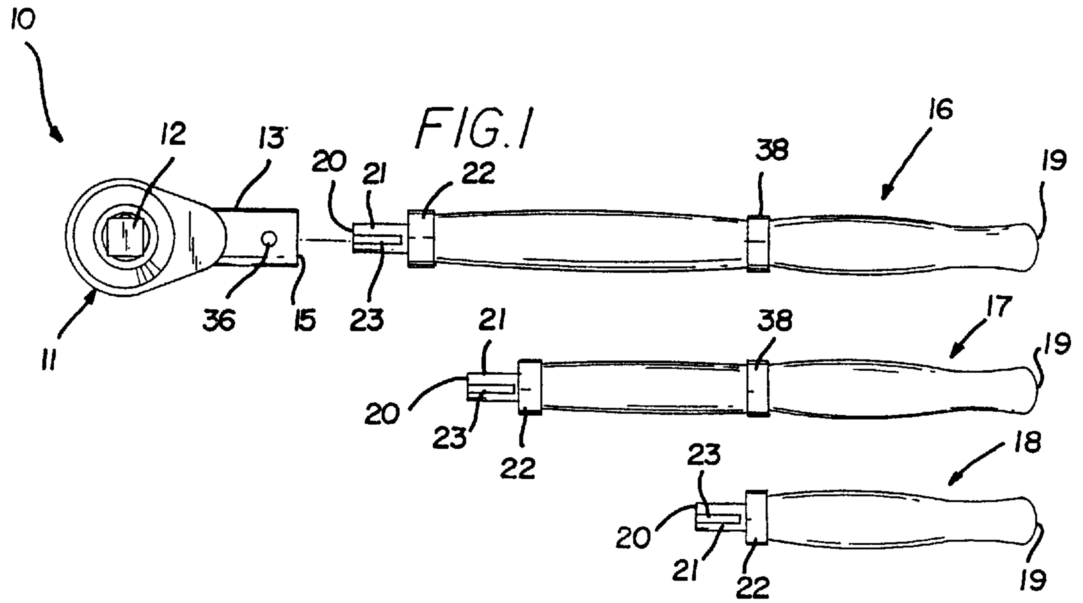
FIG. 1 is a schematic side view of a new detachable handle socket ratchet wrench system according to the present invention.
Figure 2:
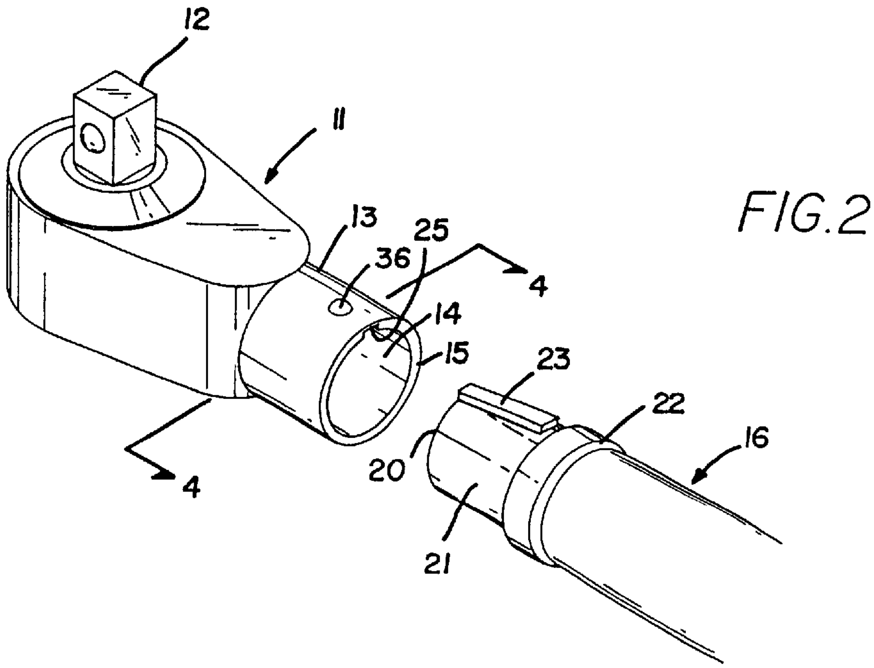
FIG. 2 is a schematic perspective view of a handle being inserted into the receptacle.
Figure 3:
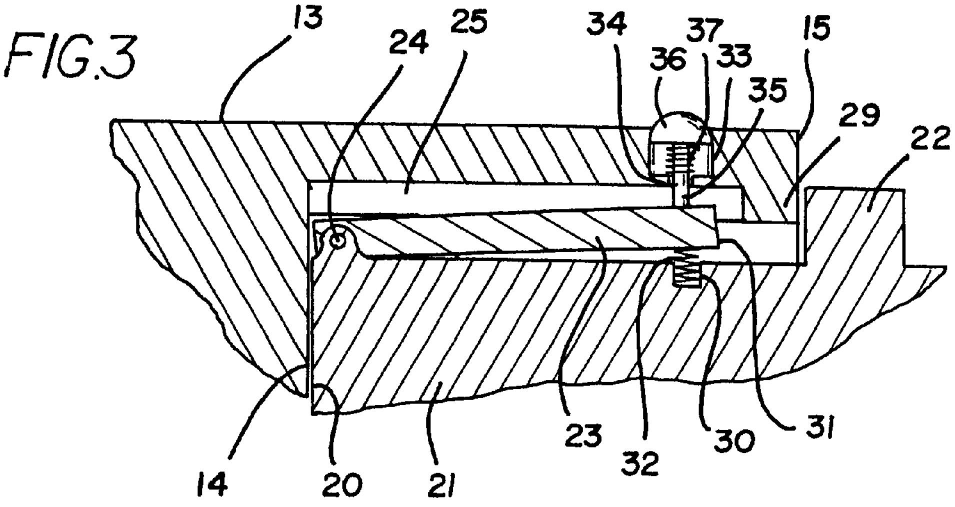
FIG. 3 is a schematic cross sectional view illustrating the region around insertion portion of a handle inserted into the receptacle.
Figure 4:
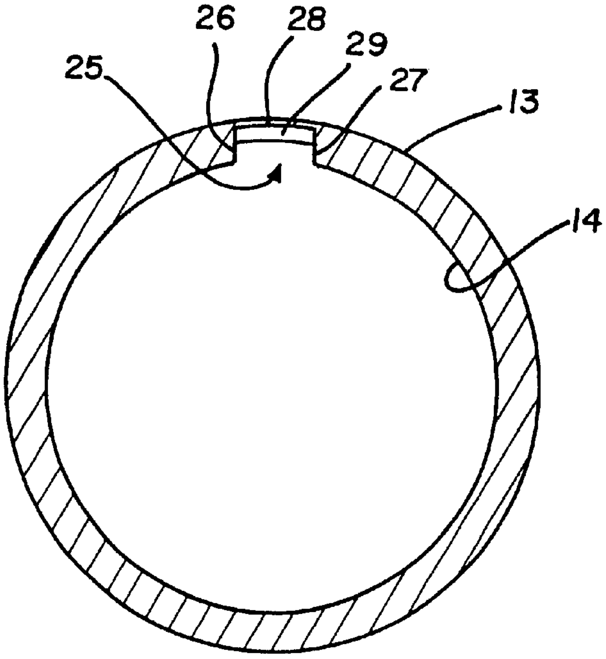
FIG. 4 is a schematic cross sectional view of the receptacle taken from line 4—4 of FIG. 2 looking out towards the free end of the sleeve.

With reference now to the drawings, and in particular to FIGS. 1 through 4 thereof, a new detachable handle socket ratchet wrench system embodying the principles and concepts of the present invention and generally designated by the reference numeral 10 will be described.

As best illustrated in FIGS. 1 through 4, the detachable handle socket ratchet wrench system 10 generally comprises a ratchet head with a tubular sleeve outwardly extending therefrom defining a receptacle. A plurality of elongate handles are provided each having an insertion portion adjacent a distal end of the respective handle. The insertion portion of each of the handles is insertable into the receptacle of the sleeve. Each of the handle has a length defined between the proximal and distal ends of the respective handle. The length of a first of the handles is greater than the length of a second of the handles and at least two times greater than the length of a third of the handles. The length of the third handle is greater than about one-half the length of the second handle and less than about four-fifths the length of the second handle.

In closer detail, the detachable handle socket ratchet wrench system 10 comprises a ratchet head 11 has a ratchet mechanism therein and a rotatable generally rectangular drive 12 outwardly extending from the ratchet mechanism. The drive of the ratchet head is designed for insertion into a generally rectangular hole in a drive end of socket designed for turning an engaged nut. A generally cylindrical tubular sleeve 13 is outwardly extended from the ratchet head. The sleeve defines a generally cylindrical receptacle 14 therein. Preferably, the receptacle of the sleeve has an axis extending substantially perpendicular to the axis of rotation of the drive of the ratchet head. The sleeve terminates at a generally circular free end 15 distal the ratchet head. The free end of the sleeve defines an opening into the receptacle of the sleeve having a generally circular periphery.

The system also includes a plurality of elongate handles 16,17,18 each having opposite proximal and distal ends 19,20, and a longitudinal axis extending between the proximal and distal ends of the respective handle. Each of the handle has a generally cylindrical insertion portion 21 at the associated distal end of the respective handle. The insertion portion of each of the handles is insertable through the opening of the free end of the sleeve into the receptacle of the sleeve.

Preferably, each of the handles has an outwardly radiating annular stop 22 therearound adjacent the associated insertion portion of the respective handle. The annular stop of each handle abuts the free end of the sleeve when the associated insertion portion of the respective handle is inserted into the receptacle of the sleeve. The opening of the free end of the sleeve has a diameter. The annular stops of the handle each have an outer diameter taken substantially perpendicular to the longitudinal axis of the respective handle about equal to one another. The outer diameters of the annular stops each are greater than the diameter of the opening of the free end of the sleeve.

The handles each has a retaining lever 23 pivotally coupled to the associated distal end of the respective handle to permit pivoting of each retaining lever at pivot axis 24 extending substantially perpendicular to the longitudinal axis of the respective handle. The retaining levers are extended along the associated insertion portion of the respective handle between the associated distal end and annular stop of the respective handle. The retaining levers each preferably lie in a plane extending substantially parallel to the longitudinal axis of the respective handle.

The receptacle of the sleeve has a longitudinal groove 25 extending between the ratchet head and the free end of the receptacle. The longitudinal groove of the receptacle is extended substantially parallel to the axis of the receptacle.

The longitudinal groove of the receptacle preferably has a generally rectangular U-shaped transverse cross section taken substantially perpendicular to the axis of the receptacle. The longitudinal groove has a spaced apart pair of generally parallel side walls 26,27 and a connecting wall 28 extending substantially perpendicularly between the side walls of the longitudinal groove.

The retaining lever of each handle is slidably insertable into the longitudinal groove of the receptacle when the respective handle is inserted into the receptacle of the sleeve. Preferably, the longitudinal groove has a lip 29 between the side walls of the longitudinal groove extending from the connecting wall of the longitudinal groove towards the receptacle. The lip of the longitudinal groove is preferably positioned adjacent the free end of the sleeve.

The insertion portions of the handles each has a recess 30 therein adjacent a terminus end 31 of the associated retaining lever of the respective handle positioned distal the distal end of the respective handle. The handles each has a biasing member 32 disposed in the recess of the respective handle, each of the biasing members biasing the terminus end of the associated retaining lever away from the associated insertion portion of the respective handle. Ideally, the biasing members each comprise a coiled compression spring. In use, the terminus end of each retaining lever abuts the lip of the longitudinal groove when the associated insertion portion of the respective handle is inserted into the sleeve to prevent sliding of the insertion portion of the respective handle from sliding out of the receptacle of the sleeve.

The sleeve has a bore 33 into the longitudinal groove of the receptacle. The bore of the sleeve has an annular shoulder 34 adjacent the longitudinal groove of the receptacle to reduce the diameter of the bore adjacent the longitudinal groove. The bore of the sleeve is preferably positioned towards the free end of the sleeve. A release pin 35 is disposed in the bore of the sleeve and is extended into the longitudinal groove of the receptacle. The release pin has an inner tip abutting the retaining lever of a handle inserted into the longitudinal groove of the receptacle. The release pin has a generally hemispherical button 36 outwardly extending from the sleeve distal the inner tip of the release pin. The button has an outer diameter greater than an inner diameter of the annular shoulder of the bore. The release pin has a biasing member 37 disposed in the bore of the sleeve between the button of the release pin and the annular shoulder of the bore. The biasing member of the release pin biasing the tip of the pin outwardly away from the longitudinal groove of the receptacle. Ideally, the biasing member of the release pin comprises a coiled compression spring disposed around the release pin.

In use, pushing of the button of the release pin moves the tip of the release pin further into the longitudinal groove and into the receptacle to pivot the terminus end of the retaining lever of a handle inserted into the receptacle towards the insertion portion of the respective handle so that the terminus end of the retaining lever does not abut the lip of the longitudinal groove to permit sliding of the handle out of the receptacle.

Each of the handle has a length defined between the proximal and distal ends of the respective handle. The length of a first of the handles 16 is greater than the length of a second of the handles 17 and at least two times greater than the length of a third of the handles 18. The length of the third handle is greater than about one-half the length of the second handle and less than about four-fifths the length of the second handle. Preferably, the length of the second handle is about five-eighths the length of the first handle and the length of the third handle is about three-eighths the length of the first handle and about three-fifths the length of the second handle. In an ideal illustrative embodiment, the first handle has a length of 8 inches, the second handle has a length of about 5 inches, and the third handle has a length of about 3 inches.

Preferably, the first and second handles each have an annular collar 38 therearound between the proximal and distal ends of the respective handle. Each of the annular collars divides the respective handle into a pair of gripping portions each designed for grasping by a hand of a user so that the user may grasp the first and second handles with both hands.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A detachable handle socket ratchet wrench system, comprising:

a ratchet head having a ratchet mechanism therein and a rotatable generally rectangular drive outwardly extending from said ratchet mechanism;

a tubular sleeve being outwardly extended from said ratchet head, said sleeve defining a receptacle;

said sleeve terminating at a free end distal to said ratchet head;

a plurality of elongate handles, each handle of said plurality of handles having opposite proximal and distal ends and a longitudinal axis extending between said proximal and distal ends;

each handle of said plurality of handles having an insertion portion at the distal end of the handle;

said insertion portion of each handle of said plurality of handles being insertable into said receptacle of said sleeve;

each handle of said plurality of handles having a length defined between said proximal and distal ends of the handle;

said length of a first handle of said plurality of handles being greater than said length of a second handle of said plurality of handles and at least two times greater than said length of a third handle of said plurality of handles, said length of said third handle being greater than about one-half said length of said second handle and less than about four-fifths said length of said second handle;

wherein each handle of said plurality of handles has a retaining lever pivotally coupled to the distal end of the handle, wherein said receptacle of said sleeve has a longitudinal groove extending between said ratchet head and said free end of said sleeve;

said sleeve having a bore into said longitudinal groove of said receptacle;

wherein said longitudinal groove has a lip being positioned adjacent to said free end of said sleeve;

a release pin being disposed in said bore of said sleeve and being extended into said longitudinal groove of said receptacle, said release pin having an inner tip abutting the retaining lever of said handle inserted into said longitudinal groove of said receptacle;

said release pin having a button outwardly extending from said sleeve distal said inner tip of said release pin; and wherein pushing of said button of said release pin presses said tip of said release pin against said retaining lever to pivot a terminus end of the retaining lever of said handle towards the insertion portion of the handle so that the terminus end of said retaining lever does not abut said lip of said longitudinal groove to permit sliding of said handle out of the receptacle; and wherein said terminus end of said retaining lever of each handle of said plurality of handles abuts said lip of said longitudinal groove when the insertion portion of the handle is inserted into said sleeve to prevent said insertion portion of the handle from sliding out of said receptacle of said sleeve.

2. The detachable handle socket ratchet wrench system of claim 1, wherein said receptacle of said sleeve has an axis extending substantially perpendicular to said drive of said ratchet head.

3. The detachable handle socket ratchet wrench system of claim 1, wherein each handle of said plurality of handles has an outwardly radiating annular stop therearound adjacent the insertion portion of the handle, said annular stop of each handle abutting said free end of said sleeve when the insertion portion of the handle is inserted into said receptacle of said sleeve.

4. The detachable handle socket ratchet wrench system of claim 3, wherein said retaining levers of each handle of said plurality of handles are extended along the insertion portion of the handle between the distal end and the annular stop of the handle.

5. The detachable handle socket ratchet wrench system of claim 1, wherein said length of said second handle is about five-eighths said length of said first handle, and wherein said length of said third handle is about three-eighths said length of said first handle and about three-fifths said length of said second handle.

6. The detachable handle socket ratchet wrench system of claim 1, wherein the bore in said sleeve has an annular shoulder adjacent said longitudinal groove of said receptacle to reduce the diameter of the bore adjacent the longitudinal groove, said bore of said sleeve being positioned towards said free end of said sleeve, said button having an outer diameter greater than an inner diameter of said annular shoulder of said bore.

7. The detachable handle socket ratchet wrench system of claim 1, wherein said longitudinal groove has a spaced apart pair of side walls and a connecting wall extending between said side walls of said longitudinal groove.

8. The detachable handle socket ratchet wrench system of claim 7, wherein said lip is located between said side walls of said longitudinal groove extending from said connecting wall of said longitudinal groove, wherein said insertion portions of said handles each have a recess therein adjacent said terminus end of the retaining lever of the handle positioned distal said distal end of the handle, wherein each of said handles has a biasing member disposed in said recess of the handle, each of said biasing members biasing said terminus end of the retaining lever away from the insertion portion of the handle.

9. A detachable handle socket ratchet wrench system, comprising:

a ratchet head having a ratchet mechanism therein and a rotatable generally rectangular drive outwardly extending from said ratchet mechanism, said drive of said ratchet head being adapted for insertion into a generally rectangular hole in a drive end of-socket;

a generally cylindrical tubular sleeve being-outwardly extended from said ratchet head, said sleeve defining a generally cylindrical receptacle;

said receptacle of said sleeve having an axis extending substantially perpendicular to said drive of said ratchet head;

said sleeve terminating at a generally circular free end distal to said ratchet head, said free end of said sleeve defining an opening into said receptacle of said sleeve having a generally circular periphery;

a plurality of elongate handles, each handle of said plurality of handles having opposite proximal and distal ends and a longitudinal axis extending between said proximal and distal ends;

each handle of said plurality of handles having a generally cylindrical insertion portion at the distal end of the handle;

said insertion portion of each handle of said plurality of handles being insertable into said receptacle of said sleeve;

each handle of said plurality of handles having an outwardly radiating annular stop therearound adjacent the insertion portion of the handle, said annular stop of each handle of said plurality of handles abutting said free end of said sleeve when the insertion portion of the handle is inserted into said receptacle of said sleeve;

said opening of said free end of said sleeve having a diameter, said annular stops of each handle of said plurality of handles each having an outer diameter about equal to one another, said outer diameters of said annular stops each being greater than said diameter of said opening of said free end of said sleeve;

each handle of said plurality of handles having a retaining lever pivotally coupled to the distal end of the handle to permit pivoting of each retaining lever at pivot axis extending substantially perpendicular to said longitudinal axis of the handle;

said retaining levers being extended along the insertion portion of each handle of said plurality of handles between the distal end and the annular stop of the handle;

said retaining levers each lying in a plane extending substantially parallel to said longitudinal axis of the handle;

said receptacle of said sleeve having a longitudinal groove extending between said ratchet head and said free end of said sleeve, said longitudinal groove of said receptacle being extended substantially parallel to said axis of said receptacle;

said longitudinal groove of said receptacle having a generally rectangular U-shaped transverse cross section taken substantially perpendicular to said axis of said receptacle;

said longitudinal groove having a spaced apart pair of generally parallel side walls and a connecting wall extending substantially perpendicularly between said side walls of said longitudinal groove;

said retaining lever of each handle of said plurality of handles being slidably insertable into said longitudinal groove of said receptacle when the handle is inserted into said receptacle of said sleeve;

said longitudinal groove having a lip between said side walls of said longitudinal groove extending from said connecting wall of said longitudinal groove, said lip of said longitudinal groove being positioned adjacent said free end of said sleeve;

said insertion portions of each handle of said plurality of handles each having a recess therein adjacent a terminus end of the retaining lever of the handle positioned distal said distal end of the handle;

each handle of said plurality of handles having a biasing member disposed in said recess of the handle, each of said biasing members biasing said terminus end of the retaining lever away from the insertion portion of the handle;

wherein said biasing members each comprise a coiled compression spring;

said terminus end of each retaining lever abutting said lip of said longitudinal groove when the insertion portion of the handle is inserted into said sleeve to prevent said insertion portion of the handle from sliding out of said receptacle of said sleeve;

said sleeve having a bore into said longitudinal groove of said receptacle, said bore of said sleeve having an annular shoulder adjacent said longitudinal groove of said receptacle, said bore of said sleeve being positioned towards said free end of said sleeve;

a release pin being disposed in said bore of said sleeve and being extended into said longitudinal groove of said receptacle, said release pin having an inner tip abutting the retaining lever of the handle inserted into said longitudinal groove of said receptacle;

said release pin having a generally hemispherical button outwardly extending from said sleeve, said button having an outer diameter greater than an inner diameter of said annular shoulder of said bore;

said release pin having a biasing member disposed in said bore of said sleeve between said button of said release pin and said annular shoulder of said bore, said biasing member of said release pin biasing said tip of said pin outwardly away from said longitudinal groove of said receptacle;

wherein said biasing member of said release pin comprises a coiled compression spring disposed around said release pin;

wherein pushing of said button of said release pin presses said tip of said release pin against said retaining lever to pivot said terminus end of the retaining lever of the handle inserted into said receptacle towards the insertion portion of the handle so that the terminus end of said retaining lever does not abut said lip of said longitudinal groove to permit sliding of said handle out of the receptacle;

each handle of said plurality of handles having a length defined between said proximal and distal ends of the handle;

said plurality of handles comprising first, second and third handles;

wherein said length of said second handle is about five-eighths said length of said first handle; and wherein said length of said third handle is about three-eighths said length of said first handle and about three-fifths said length of said second handle.

* * * * *